(12) United States Patent
Haage et al.

(10) Patent No.: US 6,186,379 B1
(45) Date of Patent: Feb. 13, 2001

(54) DEVICE FOR SECURING PIECES OF LUGGAGE IN CAR LUGGAGE COMPARTMENT

(75) Inventors: Manfred Haage, Dornstetten; Bernd Schoch, Lombach; Wilhelm Schoch, Horb; Andrè Hein, Herrenberg; Michael Braun; Dietmar Renner, both of Altensteig; Stefan Kühn, Althengstett; Friedrich Karrer, Pfalzgrafenweiler, all of (DE)

(73) Assignee: Fischerwerke Artur Fischer GmbH & Co. KG, Waldachtal (DE)

( * ) Notice: Under 35 U.S.C. 154(b), the term of this patent shall be extended for 0 days.

(21) Appl. No.: 08/961,471

(22) Filed: Oct. 31, 1997

(30) Foreign Application Priority Data

Nov. 2, 1996 (DE) ................................. 196 45 241

(51) Int. Cl.[7] ...................................................... B60R 7/00
(52) U.S. Cl. .................. 224/42.33; 224/563; 220/9.4; 296/39.1; 296/97.23
(58) Field of Search ................ 224/42.33, 42.34, 224/42.32, 42.4, 542, 563, 568; 296/39.1, 97.23; 410/153, 121, 104, 105; 248/95, 97; 220/9.4; 211/175, 184

(56) References Cited

U.S. PATENT DOCUMENTS

| 1,552,563 | * | 9/1925 | Labisky | 224/563 |
|---|---|---|---|---|
| 1,961,061 | * | 5/1934 | McCulloch | 4/585 X |
| 2,907,051 | * | 10/1959 | Phillips | 4/585 |
| 3,103,083 | * | 9/1963 | Seeger | 52/63 |
| 3,779,419 | * | 12/1973 | Heitz | 220/495.11 |
| 3,799,228 | * | 3/1974 | Crawford | 220/9.2 X |
| 4,135,634 | * | 1/1979 | Frye | 220/9.4 |
| 4,815,301 | * | 3/1989 | Deloughery | 62/235 |
| 5,134,857 | * | 8/1992 | Burley | 220/9.4 |
| 5,322,336 | * | 6/1994 | Isler | 296/100 |
| 5,381,940 | | 1/1995 | Wright . | |
| 5,520,316 | | 5/1996 | Chen . | |
| 5,713,502 | * | 2/1998 | Dixon | 224/542 |

FOREIGN PATENT DOCUMENTS

| 1580298 | * | 12/1970 | (DE) | 296/39.1 |
|---|---|---|---|---|
| 3900112A1 | | 7/1990 | (DE) . | |
| 91 09 910 U | | 12/1992 | (DE) . | |
| 4132954A1 | | 4/1993 | (DE) . | |
| 296 07 939 U1 | | 8/1996 | (DE) . | |
| 536923 | * | 4/1993 | (EP) | 224/42.4 |

* cited by examiner

Primary Examiner—Jes F. Pascua
(74) Attorney, Agent, or Firm—Michael J. Striker

(57) ABSTRACT

A device for securing pieces of luggage in a luggage compartment of a car has a frame having an adjustable size and placeable on a luggage compartment floor, and a floor mat which is impermeable to liquid and is mounted on the frame.

8 Claims, 4 Drawing Sheets

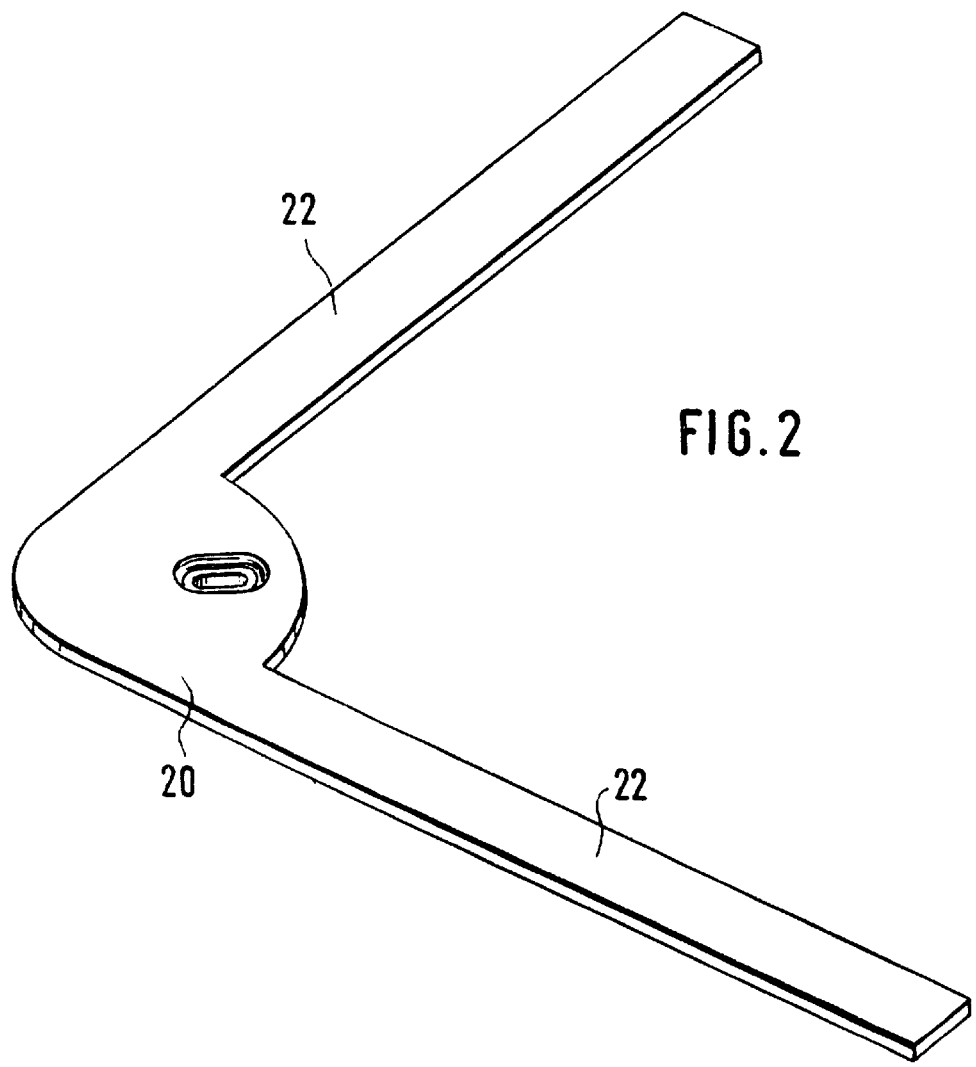
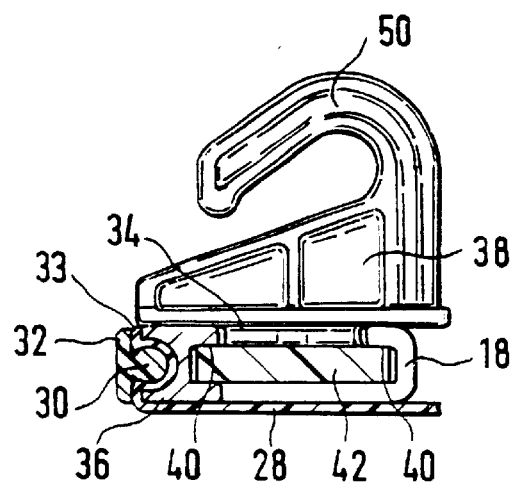

DEVICE FOR SECURING PIECES OF LUGGAGE IN CAR LUGGAGE COMPARTMENT

BACKGROUND OF THE INVENTION

The invention relates to a device for securing pieces of luggage in the luggage compartment of a car.

Devices of this type are known in the art. DE 41 32 954 A1 discloses such a device. This known device has a frame composed of corner pieces. Limbs of the corner pieces are connected to each other in a manner allowing them to be telescoped and fixed in position, so that the size of the frame can be adjusted. The frame can be adapted to the dimensions of the luggage compartment, so that it does not slide out of position during the journey even if it is merely placed onto a luggage compartment floor. Pieces of luggage can be secured to the frame so that they cannot slide out of position or fall over in the luggage compartment. The known device has the disadvantage that it does not protect the luggage compartment against soiling from unintentionally shed loose gods or spilled liquid.

SUMMARY OF THE INVENTION

Accordingly, it is an object of present invention to provide a device for securing pieces of luggage in the luggage compartment of a car which protects the luggage compartment against the soiling.

In keeping with these objects and with others which will become apparent hereinafter, one feature of present invention resides, briefly stated in a device according to the invention which has a frame of adjustable size, in which there is mounted a floor mat, which is impermeable to liquid. An edge of the floor mat is secured to the frame in a liquid-tight manner or is turned up around the frame. The device according to the invention having the floor mat fitted in the frame forms a kind of collection basin having an edge of the same height as the frame, it being possible to secure pieces of luggage to the frame.

In accordance with another feature of the present invention the floor mat preferably has a high coefficient of friction. As a result, pieces of luggage placed on the floor mat as well as the frame together with the mat are secured against sliding out of position. In order to secure the frame against sliding out of position in the luggage compartment, an underside of the floor mat can also be provided with gripping tape or small, downwardly projecting nubs, which grip into a floor carpet of the luggage compartment. Also, the frame can be provided with short, downwardly projecting pins, which tightly grip into the floor carpet of the luggage compartment, and as a result, secure the frame, together with the floor mat, against sliding out of position.

In accordance with still another embodiment of the invention, the frame has profiled strips, which are connected to each other by means of the corner pieces. The profiled strips are mounted on limbs of the corner pieces in a manner allowing them to be telescoped and fixed in position. The profiled strips and corner pieces form a preferably rectangular frame, the size of which can be adjusted.

In a further embodiment of the invention, the profiled strips are constructed for attaching securing elements so that pieces of luggage can be fastened to the frame using elastic straps, a luggage, net, belts or the like, in order to secure them in the luggage compartment.

In another embodiment of the invention, the profiled strips of the frame have an overhang extending in their longitudinal direction, which overhang is gripped from behind the securing elements attached to the frame. The overhang can be continuous or interrupted and can be arranged at the top of, on the outward side of, or on the inward side of, the frame. The attachment arrangement, extending in the longitudinal direction of the profiled strips forming the frame, allows articles to be secured at any point of the frame.

In still another embodiment, the device according to the invention has securing elements, such as hooks or eyelets. Those securing elements are provided with a foot, by means of which they can be inserted into a complementary device for attaching a securing element and locked in position by being rotated through approximately 90° about their vertical axis.

In order that relatively tall pieces of luggage can be reliably secured in a luggage compartment by means of the device according to the invention, an embodiment of the invention has luggage supports, which project in a substantially perpendicular direction from the frame. Relatively tall pieces of luggage can be attached to the luggage supports, for example by means of a retaining strap, at the level of, or above, their center of gravity. The luggage supports are attached to the frame preferably detachably or in a manner allowing them to be laid down in the plane of the frame, so that they do not cause an obstruction when they are not required. Furthermore, the flat frame without projecting luggage supports is better able to be placed in the luggage compartment or removed and stored in a space-saving manner when it is not in the luggage compartment.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 2 is a prospective view of a corner piece of the device according to the invention;

FIG. 3 is a side view of a securing element attached to the device from FIG. 1 in accordance with the invention;

DESCRIPTION OF PREFERRED EMBODIMENTS

Figure 1:
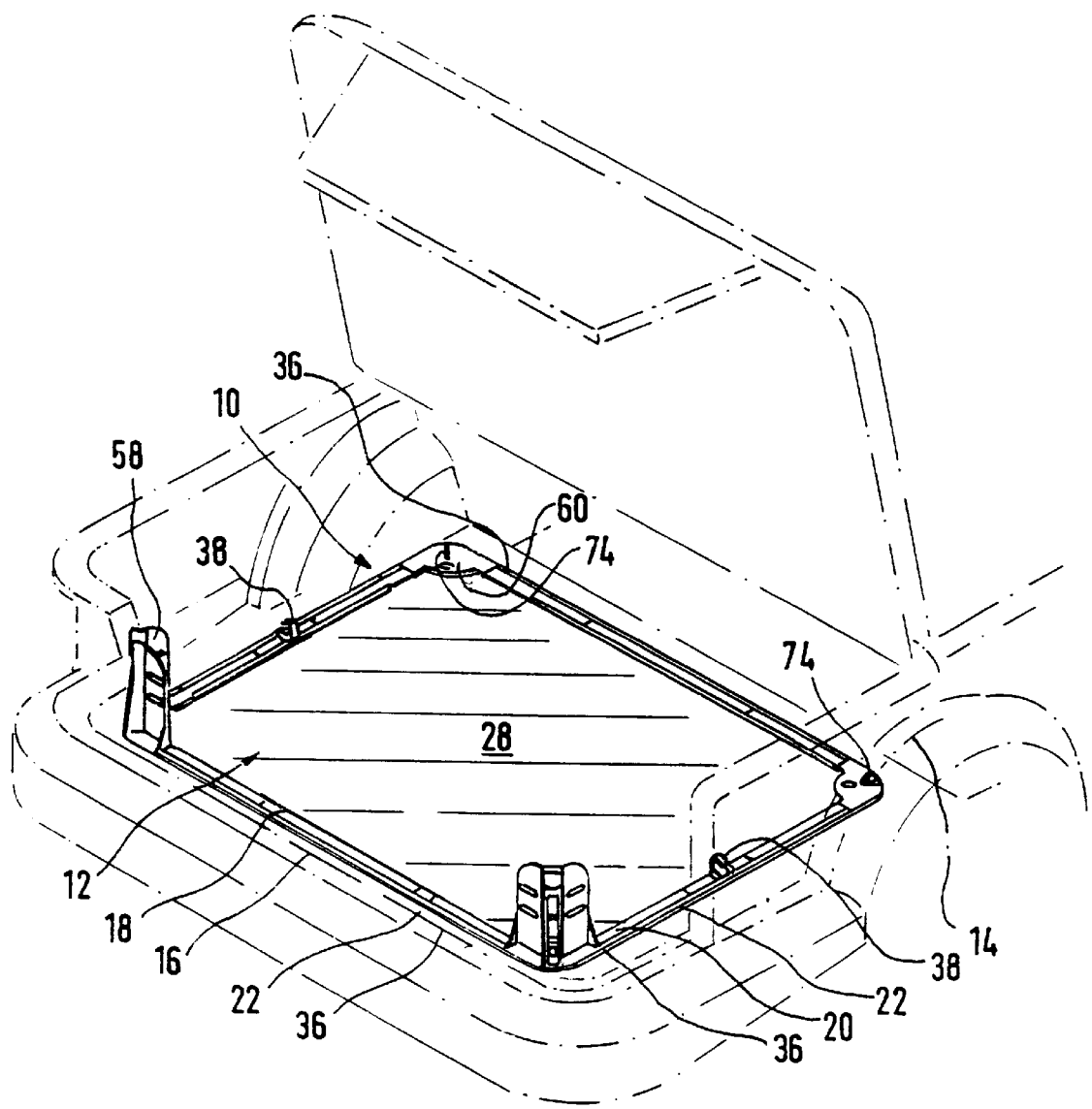
FIG. 1 is a perspective view of a device according to the invention placed in a luggage compartment.

A device for securing pieces of luggage in the luggage compartment 12 of a car 14 is identified as a whole with reference numeral 10. The device has a rectangular frame 16, which is composed of four profiled strips 18 which are connected to each other via four corner pieces 20. In the illustrated embodiment, the corner 20 are flat steel angles (FIG. 2). The profiled strips 18 consist preferably of aluminum. They have a flat, C-shaped cross-section, which the ends of the limbs of the C-profile having been bent inwards towards each other (FIG. 3). The ends of the limbs form overhangs 40 on both sides of a slot 34, which runs continuously in the longitudinal direction of the profiled strips 18 and through which access can be gained to an interior space of the C-shaped cross-section.

The profiled strips 18 are pushed, by means of their C-shaped cross-section, over limbs 22 of the corner pieces 20 in the manner of a telescope, so that the size of the frame 16, which forms a rectangle, of the device according to the invention 10 can be adjusted and adapted to the dimensions of the luggage compartment 12. On the outside, the profiled strips 18 have, on a narrow face, a profiled groove 30 of round cross-section. The opening of that profiled groove 30 being narrower than its greatest width. In other words, the profiled groove 30 becomes narrower towards its opening (FIG. 3).

Transition pieces 36 are placed onto the limbs 22 of the corner pieces 20 from the outside so that they adjoin the profiled strips. The transition pieces 36 extend the profiled groove 30 in continuous alignment. In the region of the vertex of the comer pieces 20, there are placed onto the corner pieces 20 corner caps 60, which continue the profiled groove 30 externally around the corner pieces 20 up to the next transition piece 36. The profiled groove 30 runs without interruption around the frame 16. The transition pieces 36 are cut to length depending on the size of the luggage compartment 1 and are used as spacers between the profiled sections 18 pushed over the limbs 22 of the corner pieces 20 and the corner caps 60 placed on the corner pieces 20. The size of the frame 16 is adjusted by means of the length of the transition pieces 36.

A floor mat 28, which is impermeable to liquid, is clamped in the frame 16. For clamping, an elastic clamping strip 32 is snapped into the profiled groove 30 running around the frame 16. For snapping in, the clamping strip 32 has a bead 33 of circular cross-section complementary to the profiled groove 30, and the floor mat 28 is laid around that bead 33 and inserted into the profiled groove 30 and is thereby clamped in the frame 16 of the device 10 according to the invention in a liquid-tight manner. The device 10 forms a liquid-tight floor basin.

The slot 34 of the C-shaped profiled strips 18, together with the adjacent overhangs 40, forms a device for attaching securing elements 38 having, for example, hooks 50 or eyelets. The securing elements 38 are provided for securing pieces of luggage (not shown) in the luggage compartment 12. The securing element 38 has a foot 42 spaced from the body. The foot 42, passing through the slot 34, is arranged to be inserted into the profiled strip 18 and which engages behind the overhangs 40. The securing element 38 can be attached in a positively locking manner at any pont on the profiled strip 18.

The foot 42 of the securing element 38 is rectangular. It is narrower than the slot 34. By rotating the securing element 38 through 90°, the foot 42 thereof clears the overhangs 40, and the securing element 38 can be removed from the frame 16. The insertion of the securing element 38 at any desired point on the profiled strip 18 is carried out in the reverse order. In order to facilitate the rotation of the securing element 38, the foot 42 has curved portions 44 instead of two diagonally opposite corners.

Figure 4:
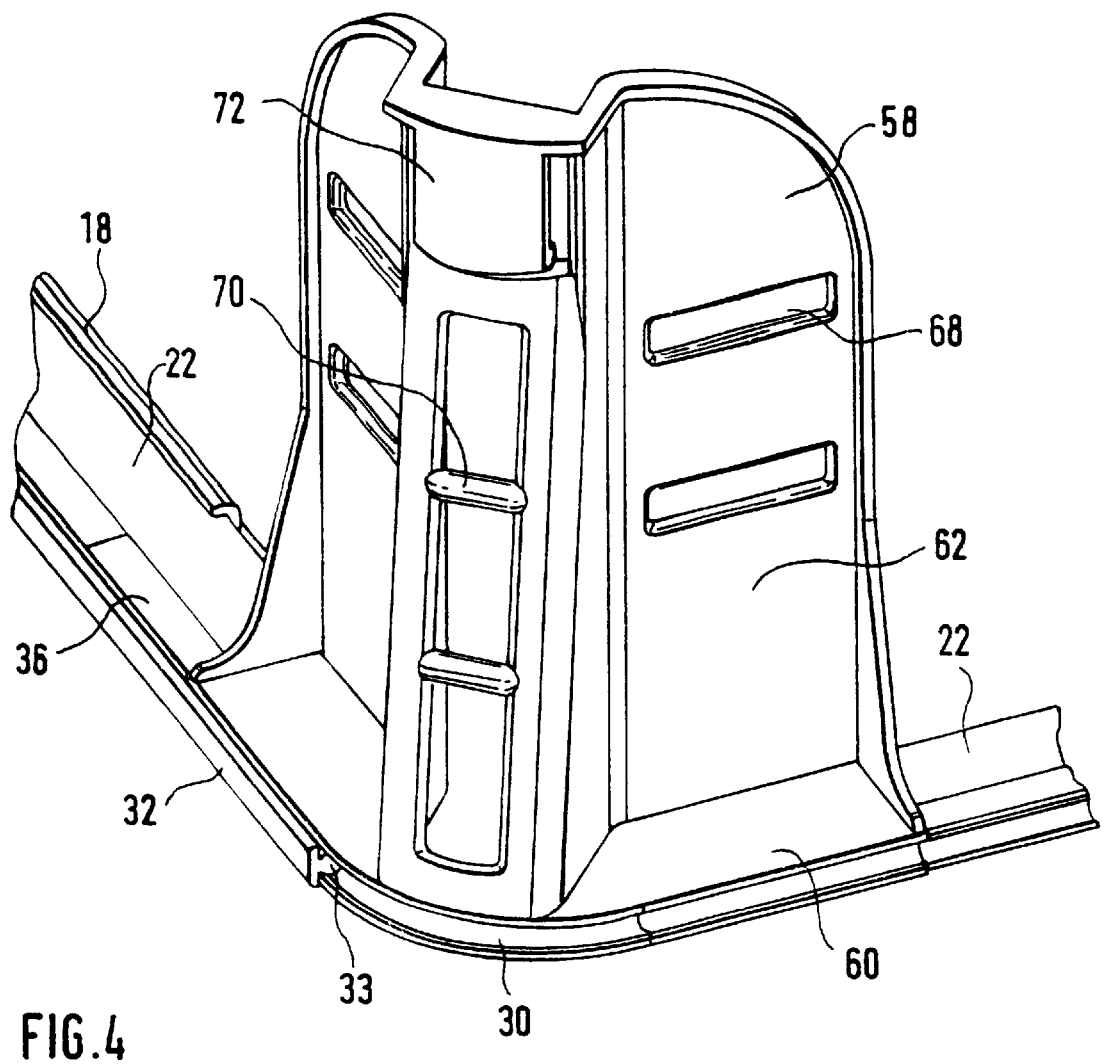
FIG. 4 is a perspective view of a luggage support attached to the device from FIG. 1 in accordance with the invention.
Figure 5:
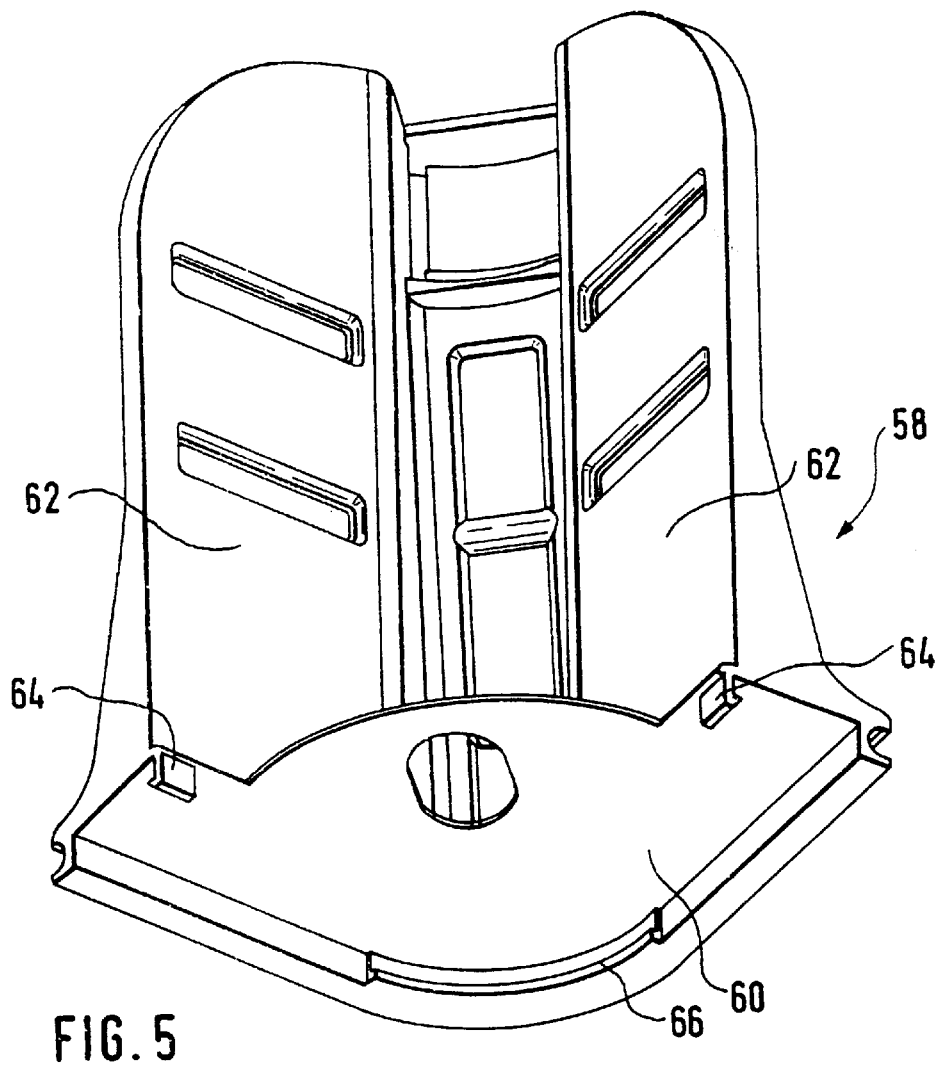
FIG. 5 shows the luggage support from FIG. 4 obliquely from below.

FIG. 4 and 5 show a luggage support 58 of the device according to the invention 10, which is integral with the corner cap 60. The corner cap 60 forms a foot, by means of which the luggage support 58 can be attached to one of the corner pieces 20 of the frame 16 so that it projects upwards. The luggage support 58 has two supporting walls 62, which are arranged at right angles to each other and extend perpendicularly upwars from the corner cap 60. From an underside of the corner cap 60, which forms the foot of the luggage support 58, there project downwards two snap hooks 64. Thereby the luggage support 58 engages behind the limbs 22 of the corner piece 20 on their inward edge. On an outward edge, the corner cap 60 has an overhanging strip 66, which engages behind an outward edge of the corner piece 20 in the vertex region thereof.

For mounting, the luggage support 58 is positioned with its overhanging strip 66 engaging behind the corner piece 20 from the outside in the vertex region thereof and is then pressed against the corner piece 20 so that the snap hooks 64 snap into place against the inward edge of the corner piece 20. The two snap hooks 64 and the overhanging strip 66 are arranged at the corners of a notional triangle, resulting in a three-point fastening between the luggage support 58 and corner piece 20. That gives the luggage support 58, especially even when subjected to a transverse load, a stable hold on the corner piece 20, and as a result, on the frame 16 of the device 10 according to the invention.

Figure 6:
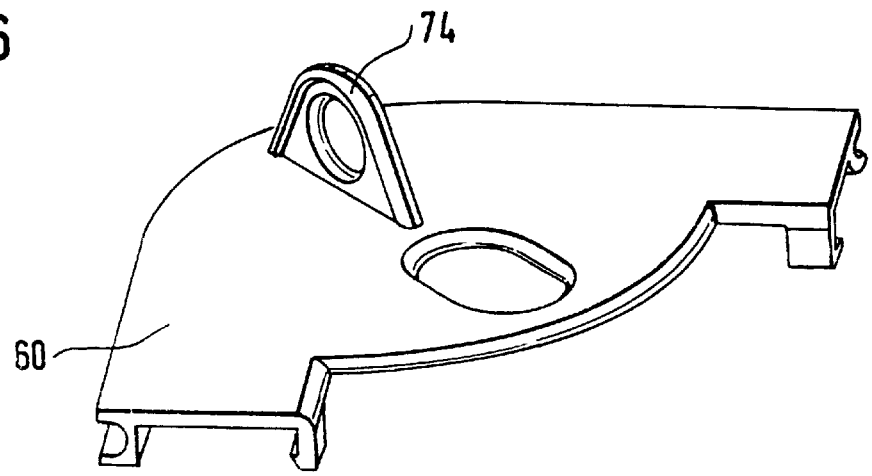
FIG. 6 is a perspective view of a further securing element in accordance with the invention.

The luggage support 58 has openings 68, bars 70 and a belt retainer 72 for securing pieces of luggage (not shown) by means of elastic straps or retaining belts. Instead of the luggage support 58, the corner cap 60 may also have, for example, an integral eyelet 74, as illustrated in FIG. 6.

It will be understood that each of the elements described above, or two or more together, may also find a useful application in other types of constructions differing from the types described above.

While the invention has been illustrated and described as embodied in device for securing pieces of luggage in car luggage compartment, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims.

What is claimed is:

1. A device for securing pieces of luggage in a luggage compartment of a car, comprising a frame having an adjustable size and placeable on a luggage compartment floor; and a floor mat which is impermeable to liquid and is mounted on said frame at its bottom side along a periphery of said frame in a liquid-tight manner to form a collection basin; and securing elements, said frame having a device for attaching said securing elements, one of said securing elements being insertable into said device for attaching securing elements and being locked in position as a result of rotation through approximately 90°.

2. A device as defined in claim 1, wherein said floor mat is mounted on said frame with edges of said floor mat turned up.

3. A device as defined in claim 1, wherein said floor mat has a high coefficient of friction.

4. A device as defined in claim 1, wherein said frame has profiled strips, and corner pieces connecting said profiled strips with one another, said corner pieces having limbs to which said profiled strips are attached.

5. A device as defined in claim 1, wherein said device for attaching securing elements has an overhang running in a longitudinal direction of said frame.

6. A device as defined in claim 1, wherein said frame has luggage supports projecting from said frame in a substantially perpendicular direction of said frame.

7. A device as defined in claim 6, wherein said luggage supports are detachably attached to said frame.

8. A device for securing pieces of luggage in a luggage compartment of a car, comprising a frame having an adjustable size and placeable on a luggage compartment floor; and a floor mat which is impermeable to liquid and is mounted on said frame at its bottom side to form a collection basin, said frame having an outer profile groove in which said floor mat is clamped over its periphery in a liquid-tight manner, said frame having corner pieces; and profiled strips telescopably fitted on said corner pieces and each provided with a portion of said profiled groove for clamping said floor mat.

* * * * *